(12) United States Patent
Iwamura et al.

(10) Patent No.: US 8,514,740 B2
(45) Date of Patent: Aug. 20, 2013

(54) MOBILE COMMUNICATION SYSTEM

(75) Inventors: Mikio Iwamura, Yokohama (JP);
Hiroyuki Ishii, Yokosuka (JP); Minami Ishii, Yokohama (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 100 days.

(21) Appl. No.: 13/126,885

(22) PCT Filed: Oct. 28, 2009

(86) PCT No.: PCT/JP2009/068494
§ 371 (c)(1),
(2), (4) Date: Jul. 12, 2011

(87) PCT Pub. No.: WO2010/050504
PCT Pub. Date: May 6, 2010

(65) Prior Publication Data
US 2011/0261772 A1    Oct. 27, 2011

(30) Foreign Application Priority Data

Oct. 31, 2008  (JP) ............................... P2008-282571
Dec. 16, 2008  (JP) ............................... P2008-320014

(51) Int. Cl.
*G01R 31/08*    (2006.01)
(52) U.S. Cl.
USPC ........................... 370/252; 370/329; 370/338
(58) Field of Classification Search
USPC ...................................................... 370/329
See application file for complete search history.

(56) References Cited

U.S. PATENT DOCUMENTS

| 6,374,109 | B1 * | 4/2002 | Shaheen et al. | 455/434 |
| 2008/0279257 | A1 * | 11/2008 | Vujcic et al. | 375/132 |
| 2009/0003477 | A1 * | 1/2009 | Nishio et al. | 375/260 |
| 2010/0111009 | A1 * | 5/2010 | Pajukoski et al. | 370/329 |

FOREIGN PATENT DOCUMENTS

| CN | 101009906 A | 8/2007 |
| EP | 1973251 A1 | 9/2008 |
| JP | 2008-124832 A | 5/2008 |

OTHER PUBLICATIONS

Peter Wang LTE-Physical-Layer Overview.*
International Search Report w/translation from PCT/JP2009/068494 dated Feb. 2, 2010 (3 pages).
Written Opinion from PCT/JP2009/068494 dated Feb. 2, 2010 (4 pages).
3GPP TSG RAN WG2 meeting #63, R2-083955; "Application of ASN.1 extension agreements"; Ericsson; Cheju Island, South Korea; Aug. 18-22, 2008 (5 pages).

(Continued)

*Primary Examiner* — Duc C Ho
(74) *Attorney, Agent, or Firm* — Osha Liang LLP

(57) ABSTRACT

In a mobile communication system according to the present invention, a radio base station (eNB) is configured to transmit broadcast information including a parameter to which a frequency bandwidth used in the mobile communication system is set; a mobile station (UE#1) is configured to determine, when a predetermined value is set to the parameter included in the received broadcast information, that a first frequency bandwidth is the frequency bandwidth used in the mobile communication system; and a mobile station (UE#2) is configured to determine, when the predetermined value is set to the parameter included in the received broadcast information, that a second frequency bandwidth different from the first frequency bandwidth is the frequency bandwidth used in the mobile communication system.

4 Claims, 5 Drawing Sheets

(56) References Cited

OTHER PUBLICATIONS

3GPP TS 36.331 V8.3.0; "3rd Generation Partnership Project; Technical Specification Group Radio Access Network; Evolved Universal Terrestrial Radio Access (E-UTRA) Radio Resource Control (RRC); Protocol specification (Release 8)"; Sep. 2008 (178 pages).

3GPP TS 36.211 V8.4.0; "3rd Generation Partnership Project; Technical Specification Group Radio Access Network; Evolved Universal Terrestrial Radio Access (E-UTRA) Radio; Physical Channels and Modulation (Release 8)"; Sep. 2008 (78 pages).

3GPP TS 36.213 V8.4.0; "3rd Generation Partnership Project; Technical Specification Group Radio Access Network; Evolved Universal Terrestrial Radio Access (E-UTRA); Physical layer procedures (Release 8)"; Sep. 2008 (60 pages).

Office Action in corresponding Chinese Application No. 200980143160.9 dated Apr. 2, 2013 (11 pages).

ESPCENET Abstract, Publication No. CN101009906A dated Aug. 1, 2007 (1 page).

* cited by examiner

FIG. 2

```
MasterInformationBlock ::=    SEQUENCE {
dl-Bandwidth                  ENUMERATED { n6, n15, n25, n50, n75, n100,
                                          spare2, spare1 },
phich-Configuration           PHICH-Configuration,
systemFrameNumber             BIT STRING (SIZE (8)),
spare                         BIT STRING (SIZE (1)) }
}
```

FIG. 3

```
SystemInformationBlockType2 ::=     SEQUENCE {
    accessBarringInformation            SEQUENCE {
        accessBarringForEmergencyCalls      BOOLEAN,
        accessBarringForSignalling          AccessClassBarringInformation   OPTIONAL,   -- Need OP
        accessBarringForOriginatingCalls    AccessClassBarringInformation   OPTIONAL,   -- Need OP
    } OPTIONAL,                                                                         -- Need OP
    radioResourceConfigCommon           RadioResourceConfigCommonSIB,
    ue-TimersAndConstants               UE-TimersAndConstants,
    frequencyInformation                SEQUENCE {
        ul-EARFCN                           INTEGER (0..maxEARFCN)          OPTIONAL,   -- Need OP
        ul-Bandwidth                        ENUMERATED {
                                                n6, n15, n25, n50, n75, n100,
                                                spare2, spare1} OPTIONAL,   -- Need OP
        additionalSpectrumEmission          INTEGER (0..31)
    },
    ul-CyclicPrefixLength
    mbsfn-SubframeConfiguration         ENUMERATED {len1, len2},
    timeAlignmentTimerCommon            MBSFN-SubframeConfiguration     OPTIONAL,       -- Need OD
    ...                                 TimeAlignmentTimer,
}

AccessClassBarringInformation ::=   SEQUENCE {
    accessProbabilityFactor             ENUMERATED {
                                            p00, p05, p10, p15, p20, p25, p30, p40,
                                            p50, p60, p70, p75, p80, p85, p90, p95},
    accessBarringTime                   ENUMERATED {s4, s8, s16, s32, s64, s128, s256, s512},
    accessClassBarringList              AccessClassBarringList
}

AccessClassBarringList ::=          SEQUENCE (SIZE (maxAC)) OF SEQUENCE {
    accessClassBarring                  BOOLEAN
}

MBSFN-SubframeConfiguration ::=     SEQUENCE (SIZE (1..maxMBSFN-Allocations)) OF SEQUENCE {
    radioframeAllocationPeriod          ENUMERATED {n1, n2, n4, n8, n16, n32},
    radioframeAllocationOffset          INTEGER (0...7),
    subframeAllocation                  INTEGER (1..6)
}
```

| PARAMETER | SYSTEM BANDWIDTH |
|---|---|
| n6 | 1.4MHz |
| n15 | 3MHz |
| n25 | 5MHz |
| n50 | 10MHz |
| n75 | 15MHz |
| n100 | 20MHz |
| spare2 | 15MHz |
| spare1 | 20MHz |

| PARAMETER | SYSTEM BANDWIDTH |
|---|---|
| n6 | 1.4MHz |
| n15 | 3MHz |
| n25 | 5MHz |
| n50 | 10MHz |
| n75 | 15MHz |
| n100 | 20MHz |
| spare2 | 25MHz |
| spare1 | 40MHz |

MOBILE COMMUNICATION SYSTEM

TECHNICAL FIELD

The present invention relates to a mobile communication system in which a first mobile station including a first capability and a second mobile station including a second capability can exist.

BACKGROUND ART

In a mobile communication system of the LTE (Long Term Evolution) scheme defined by the 3GPP, a radio base station eNB is configured to notify, to a subordinate cell, a frequency bandwidth used in a downlink of the mobile communication system, by a parameter "dl-Bandwidth" in a MIB (Master Information Block) forming broadcast information.

Moreover, in the mobile communication system, the radio base station eNB is configured to notify, the subordinate cell, a frequency bandwidth used in an uplink of the mobile communication system, by a parameter "ul-Bandwidth" in an SIB 2 (System Information Block Type 2) forming the broadcast information.

SUMMARY OF THE INVENTION

Problems to be Solved by the Invention

In this case, there is a possibility that a frequency bandwidth used in a mobile communication system of the next-generation LTE scheme is larger than a frequency bandwidth used in a mobile communication system of the current-generation LTE scheme.

Another possibility is that depending on a circumstance involving a frequency assignment in each county, a different frequency bandwidth, which is not defined in the mobile communication system of the current-generation LTE scheme, is defined.

Thus, it is regulated that back-up values of "spare1" and "spare2" to which the frequency bandwidth is not assigned at this moment can be set to the above-described parameters "dl-Bandwidth" and "ul-Bandwidth".

However, there is a problem that a mobile station UE that is compatible with the current-generation LTE scheme but not compatible with the next-generation LTE scheme cannot grasp the frequency bandwidth used in the uplink or the downlink of the mobile communication system of the next-generation LTE scheme, when the "spare1" and the "spare2" are set to the above-described parameters "dl-Bandwidth" and "ul-Bandwidth", and therefore, the mobile station UE cannot be used in the mobile communication system of the next-generation LTE scheme.

That is, there is a problem that in the mobile communication system of the next-generation LTE scheme, it is not possible to realize "Forward Compatibility".

Therefore, the present invention is intended to overcome the above-described problem. An object of the present invention is to provide a mobile communication system capable of realizing the above-described "Forward Compatibility".

Means for Solving the Problem

A first aspect of the present invention is summarized as a mobile communication system in which a first mobile station including a first capability and a second mobile station including a second capability can exist, wherein a radio base station is configured to transmit broadcast information including a parameter to which a frequency bandwidth used in the mobile communication system is set; the first mobile station is configured to determine, when a predetermined value is set to the parameter included in the received broadcast information, that a first frequency bandwidth is the frequency bandwidth used in the mobile communication system; and the second mobile station is configured to determine, when the predetermined value is set to the parameter included in the received broadcast information, that a second frequency bandwidth different from the first frequency bandwidth is the frequency bandwidth used in the mobile communication system.

In the first aspect of the present invention, a frequency bandwidth used in a downlink of the mobile communication system can be configured to be set to the parameter; and the parameter can be configured to be included in a MIB (Master Information Block) forming the broadcast information.

In the first aspect of the present invention, a frequency bandwidth used in an uplink of the mobile communication system can be configured to be set to the parameter; and the parameter can be configured to be included in a SIB (System Information Block) forming the broadcast information.

In the first aspect of the present invention, the predetermined value can include a first predetermined value and a second predetermined value; the second mobile station can be configured to determine, when the first predetermined value is set to the parameter included in the received broadcast information, that the second frequency bandwidth formed by an even number of resource blocks is the frequency bandwidth used in the mobile communication system; and the second mobile station can be configured to determine, when the second predetermined value is set to the parameter included in the received broadcast information, that the second frequency bandwidth formed by an odd number of resource blocks is the frequency bandwidth used in the mobile communication system.

Effect of the Invention

As explained above, according to the present invention, it is possible to provide a mobile communication system capable of realizing the above-described "Forward Compatibility".

BRIEF DESCRIPTION OF THE DRAWINGS

FIG. 2 is a diagram illustrating one example of broadcast information (MIB) transmitted by the radio base station according to the first embodiment of the present invention.

FIG. 3 is a diagram illustrating one example of broadcast information (SIB 2) transmitted by the radio base station according to the first embodiment of the present invention.

FIG. 5 is a diagram illustrating one example of a relationship between "parameter" and "system bandwidth" managed by the mobile station according to the first embodiment of the present invention.

BEST MODES FOR CARRYING OUT THE INVENTION (Configuration of Mobile Communication System According to First Embodiment of the Present Invention)

With reference to FIG. 1 to FIG. 6, the configuration of a mobile communication system according to a first embodiment of the present invention will be explained.

Figure 1:
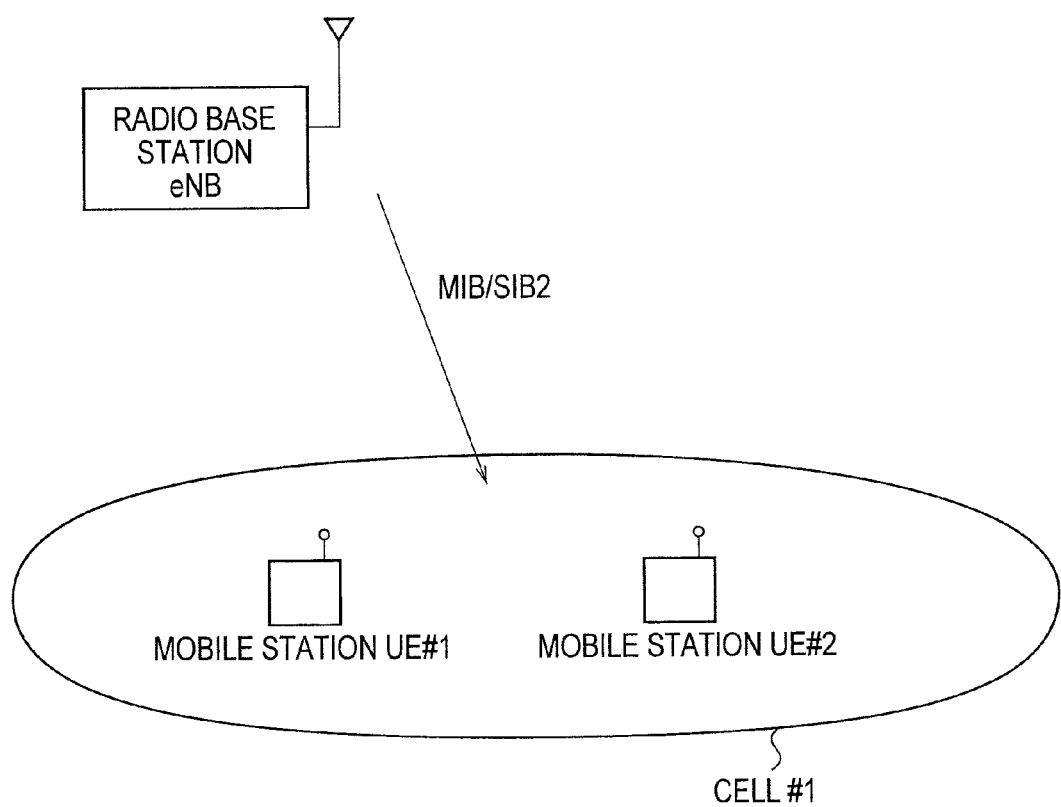
FIG. 1 is a diagram showing the entire configuration of a mobile communication system according to a first embodiment of the present invention.

As illustrated in FIG. 1, the mobile communication system according to this embodiment may be a mobile communication system of the next-generation LTE scheme, for example, a mobile communication system of the LTE (Release. 9) scheme or a mobile communication system of the LTE-Advanced scheme, or may be a mobile communication system of the current-generation LTE scheme, for example, the LTE (Release. 8) scheme.

As illustrated in FIG. 1, the mobile communication system according to this embodiment includes a radio base station eNB, a mobile station UE#1, and a mobile station UE#2.

In this case, the mobile station UE#1 is a first mobile station including a first capability compatible with the next-generation LTE scheme, and the mobile station UE#2 is a second mobile station including a second capability (not compatible with the next-generation LTE scheme) compatible with the current-generation LTE scheme, for example, the LTE (Release. 8) scheme.

In a subordinate cell #1, the radio base station eNB is configured to transmit broadcast information (MIB) including a parameter "dl-Bandwidth", as illustrated in FIG. 2, and configured to transmit broadcast information (SIB 2) including a parameter "ul-Bandwidth", as illustrated in FIG. 3.

In this case, it is configured so that a frequency bandwidth used in a downlink of the mobile communication system is set to the parameter "dl-Bandwidth".

Specifically, as illustrated in FIG. 2, it is regulated so that "n6", "n15", "n25", "n50", "n75", "n100", "spare1", and "spare2" can be set to the parameter "dl-Bandwidth".

In this case, in order to express six types of "n6", "n15", "n25", "n50", "n75", and "n100", at least three bits are needed in the parameter "dl-Bandwidth".

When the "dl-Bandwidth" is expressed in three bits, then it is possible to express a total of eight types of values, and therefore, the "spare1" and the "spare2" are defined as a spare.

It is noted that if the "dl-Bandwidth" is expressed in four bits, then it is possible to express a total of 16 types of values, and therefore, "spare1" through "spare10" may be defined as a spare. In this case also, the present invention can be similarly applied.

Moreover, it is configured that a frequency bandwidth used in an uplink of the mobile communication system is set to the parameter "ul-Bandwidth".

Specifically, as illustrated in FIG. 3, it is regulated so that "n6", "n15", "n25", "n50", "n75", "n100", "spare1", and "spare2" can be set to the parameter "ul-Bandwidth".

In this case, in order to express six types of "n6", "n15", "n25", "n50", "n75", and "n100", at least three bits are needed in the parameter "ul-Bandwidth".

When the "ul-Bandwidth" is expressed in three bits, then it is possible to express a total of eight types of values, and therefore, the "spare1" and the "spare2" are defined as a spare.

It is noted that when the "ul-Bandwidth" is expressed in four bits, then it is possible to express a total of 16 types of values, and therefore, "spare1" through "spare10" may be defined as a spare. In this case also, the present invention can be similarly applied.

Moreover, "n6", "n15", "n25", "n50", "n75", and "n100" indicate the frequency bandwidth used in the downlink or the uplink and a resource block number configuring such frequency bandwidths.

Specifically, "n6" indicates that the frequency bandwidth is "1.4 MHz" and the resource block number is "6", "n15" indicates that the frequency bandwidth is "3 MHz" and the resource block number is "15", "n25" indicates that the frequency bandwidth is "5 MHz" and the resource block number is "25", "n50" indicates that the frequency bandwidth is "10 MHz" and the resource block number is "50", "n75" indicates that the frequency bandwidth is "15 MHz" and the resource block number is "75", and "n100" indicates that the frequency bandwidth is "20 MHz" and the resource block number is "100".

In this case, the radio base station eNB of the next-generation LTE scheme is configured to be able to set, to "spare1" and "spare2", the frequency bandwidth used in the uplink or the downlink of the mobile communication system.

On the other hand, the radio base station eNB of the current-generation LTE scheme is configured to be able not to set, to "spare1" and "spare2", the frequency bandwidth used in the uplink or the downlink of the mobile communication system.

Figure 4:
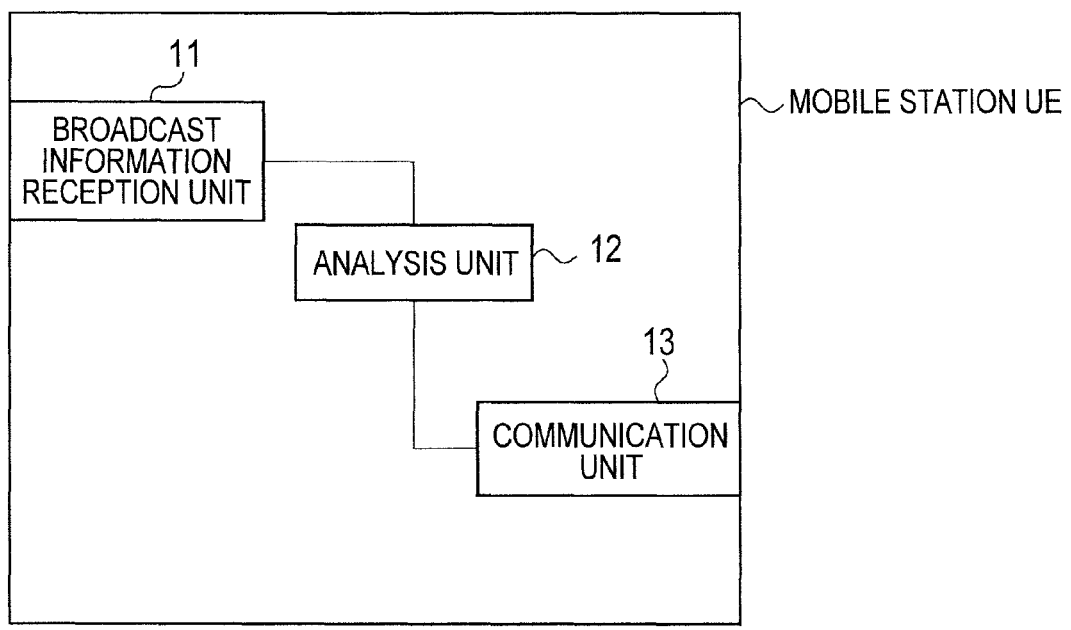
FIG. 4 is a functional block diagram of a mobile station according to the first embodiment of the present invention.

As illustrated in FIG. 4, the mobile station UE includes a broadcast information reception unit 11, an analysis unit 12, and a communication unit 13.

The broadcast information reception unit 11 is configured to receive the broadcast information transmitted by the radio base station eNB. Specifically, the broadcast information reception unit 11 is configured to receive the MIB, the SIB 1, the SIB 2, etc., forming the broadcast information.

The analysis unit 12 is configured to analyze the parameter "dl-Bandwidth" included in the broadcast information (MIB) received by the broadcast information reception unit 11, so as to detect the frequency bandwidth used in the downlink of the mobile communication system.

Moreover, the analysis unit 12 is configured to analyze the parameter "ul-Bandwidth" included in the broadcast information (SIB 2) received by the broadcast information reception unit 11, so as to detect the frequency bandwidth used in the uplink of the mobile communication system.

In this case, when "spare1" and "spare2" are set to the parameter "dl-Bandwidth" or "ul-Bandwidth", then the analysis unit 12 of the mobile station UE#2 may be configured to determine that the frequency bandwidth used in the mobile communication system is not set to the parameter "dl-Bandwidth" or "ul-Bandwidth".

Figures 5A, 5B, 6:
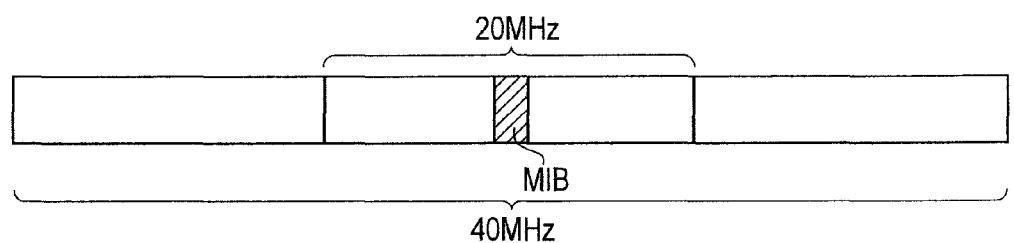
FIG. 6 is a diagram illustrating one example of a system bandwidth usable in the mobile station according to the first embodiment of the present invention.

For example, with reference to a table illustrated in FIG. 5(a), when "n6" is set to the parameter "dl-Bandwidth" or "ul-Bandwidth", then the analysis unit 12 of the mobile station UE#2 is configured to determine that the "1.4 MHz" corresponding to "n6" is the frequency bandwidth used in the downlink or the uplink of the mobile communication system.

Likewise, with reference to a table illustrated in FIG. 5(b), when "n6" is set to the parameter "dl-Bandwidth" or "ul-Bandwidth", then the analysis unit 12 of the mobile station UE#1 is configured to determine that the "1.4 MHz" corresponding to "n6" is the frequency bandwidth used in the downlink or the uplink of the mobile communication system.

That is, when "n6" through "n100" are set to the parameter "dl-Bandwidth" or "ul-Bandwidth", then the analysis unit 12 of the mobile station UE#2 and the analysis unit 12 of the mobile station UE#1 are respectively configured to determine that the frequency bandwidths corresponding to "n6" through "n100" are the frequency bandwidths used in the downlink or the uplink of the mobile communication system.

On the other hand, with reference to the table illustrated in FIG. 5(a), when "spare1 (predetermined value)" is set to the parameter "dl-Bandwidth" or "ul-Bandwidth", then the analysis unit 12 of the mobile station UE#2 is configured to determine that the "20 MHz (second frequency bandwidth)" corresponding to "n100" is the frequency bandwidth used in the downlink or the uplink of the mobile communication system.

Moreover, with reference to the table illustrated in FIG. 5(a), when "spare2 (predetermined value)" is set to the parameter "dl-Bandwidth" or "ul-Bandwidth", then the analysis unit 12 of the mobile station UE#2 is configured to determine that the "15 MHz (second frequency bandwidth)" corresponding to "n75" is the frequency bandwidth used in the downlink or the uplink of the mobile communication system.

On the other hand, with reference to the table illustrated in FIG. 5(b), when "spare1 (predetermined value)" is set to the parameter "dl-Bandwidth" or "ul-Bandwidth", then the analysis unit 12 of the mobile station UE#1 is configured to determine that the "40 MHz (first frequency bandwidth)" corresponding to "n200" is the frequency bandwidth used in the downlink or the uplink of the mobile communication system.

Further, with reference to the table illustrated in FIG. 5(b), when "spare2 (predetermined value)" is set to the parameter "dl-Bandwidth" or "ul-Bandwidth", then the analysis unit 12 of the mobile station UE#1 is configured to determine that the "25 MHz (first frequency bandwidth)" corresponding to "n125" is the frequency bandwidth used in the downlink or the uplink of the mobile communication system.

Thus, when "spare1" and "spare2" are set to the parameter "dl-Bandwidth" or "ul-Bandwidth", then the analysis unit 12 of the mobile station UE#2 and the analysis unit 12 of the mobile station UE#1 are respectively configured to determine that a different frequency bandwidth is the frequency bandwidth used in the downlink or the uplink of the mobile communication system.

When "spare1 (first predetermined value)" is set to the parameter "dl-Bandwidth" or "ul-Bandwidth", then the analysis unit 12 of the mobile station UE#2 can be configured to determine that the second frequency bandwidth (for example, "20 MHz" corresponding to "n100") formed by an even number of resource blocks is the frequency bandwidth used in the downlink or the uplink of the mobile communication system.

Moreover, when "spare2 (second predetermined value)" is set to the parameter "dl-Bandwidth" or "ul-Bandwidth", then the analysis unit 12 of the mobile station UE#2 can be configured to determine that the second frequency bandwidth (for example, "15 MHz" corresponding to "n75") formed by an odd number of resource blocks is the frequency bandwidth used in the downlink or the uplink of the mobile communication system.

According to such a configuration, in the future, when the frequency bandwidth formed by an even number of the resource blocks is extended, then "spare1" is set to the parameter "dl-Bandwidth" or "ul-Bandwidth", and when the frequency bandwidth formed by an odd number of resource blocks is extended, then "spare2" is set to the parameter "dl-Bandwidth" or "ul-Bandwidth", and thereby, the analysis unit 12 of the mobile station UE#2 can correspond to the both cases of where the frequency bandwidth formed by an even number of resource blocks is extended and where the frequency bandwidth formed by an odd number of resource blocks is extended.

Specifically, in the LTE scheme, a synchronization channel (SCH) used for a cell search and a broadcast channel (BCH) through which the broadcast information MIB is transmitted are transmitted at a frequency bandwidth equivalent to the six resource blocks that is the center of the frequency bandwidth used in the mobile communication system.

In this case, a symbol disposition of the physical channels (SCH and BCH) differs in the resource block depending either on the case where the frequency bandwidth is formed by an odd number of the resource blocks or the case where the frequency bandwidth is formed by an even number of the resource blocks.

Therefore, in such a case, the analysis unit 12 of the mobile station UE#2 is desirably configured such that a method of receiving the above-described channels (SCH/BCH, etc.,) differs depending either on the case where "spare1" is set or the case where "spare2" is set.

Moreover, when "spare1" and "spare2" are set to the parameter "dl-Bandwidth" or "ul-Bandwidth", then with reference to the table illustrated in FIG. 5(a), the analysis unit 12 of the mobile station UE#2 can be configured to determine that the respectively different frequency bandwidths are the frequency bandwidth used in the downlink or the uplink of the mobile communication system.

Further, when "spare1" and "spare2" are set to the parameter "dl-Bandwidth" or "ul-Bandwidth", then with reference to the table illustrated in FIG. 5(a), the analysis unit 12 of the mobile station UE#2 can be configured to determine that the mobile communication system is unusable.

Moreover, the analysis unit 12 of the mobile station UE#1 can be configured to receive a parameter "ExtendedBandwidth" other than the parameter "dl-Bandwidth" or "ul-Bandwidth" from the broadcast information, and based on the "dl-Bandwidth", the "ul-Bandwidth", and/or the "ExtendedBandwidth", the analysis unit 12 can be configured to determine the frequency bandwidth used in the downlink or the uplink of the mobile communication system.

The communication unit 13 is configured to receive, in the frequency bandwidth determined by the analysis unit 12, a predetermined signal via a downlink channel such as a dedicated downlink shared channel PDSCH (Physical Downlink Shared Channel) and a dedicated downlink control channel PDCCH (Physical Downlink Control Channel).

Moreover, the communication unit 13 is configured to transmit, in the frequency bandwidth determined by the analysis unit 12, a predetermined signal via an uplink channel such as a dedicated uplink shared channel PUSCH (Physical Uplink Shared Channel), a dedicated uplink control channel PUCCH (Physical Uplink Control Channel), and a physical random access channel PRACH (Physical Random Access Channel).

For example, as illustrated in FIG. 6, the communication unit 13 of the mobile station UE#1 is configured, within 40 MHz, to receive a predetermined signal via a downlink channel and to transmit a predetermined signal via an uplink channel.

On the other hand, as illustrated in FIG. 6, the communication unit 13 of the mobile station UE#2 is configured, within 20 MHz, to receive a predetermined signal via a downlink channel and to transmit a predetermined signal via an uplink channel.

(Operation and Effect of the Mobile Communication System According to the First Embodiment of the Present Invention)

According to the mobile communication system based on the first embodiment of the present invention, the mobile communication system is configured to be compatible with the current-generation LTE scheme, and even if in the mobile station UE#2 not compatible with the mobile communication system of the next-generation LTE scheme, "spare1" and "spare2" are set to the parameter "dl-Bandwidth" or "ul-Bandwidth", a predetermined frequency bandwidth is determined to be the frequency bandwidth used in the downlink or the uplink of the mobile communication system, and therefore, such the mobile station UE can be used in the mobile communication system of the next-generation LTE scheme.

The operation of the above-described mobile station UE or radio base station eNB may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the mobile station UE and the radio base station eNB. As a discrete component, such a storing medium and processor may be arranged in the mobile station UE and the radio base station eNB.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A mobile communication system in which a first mobile station including a first capability and a second mobile station including a second capability can exist, wherein
a radio base station is configured to transmit broadcast information including a parameter to which a frequency bandwidth used in the mobile communication system is set;
the first mobile station is configured to determine, when a predetermined value is set to the parameter included in the received broadcast information, that a first frequency bandwidth is the frequency bandwidth used in the mobile communication system, wherein the first mobile station has capability for next generation LTE; and
the second mobile station is configured to determine, when the predetermined value is set to the parameter included in the received broadcast information, that a second frequency bandwidth different from the first frequency bandwidth is the frequency bandwidth used in the mobile communication system, wherein the second mobile station does not have capability for next generation LTE.

2. The mobile communication system according to claim 1, wherein
a frequency bandwidth used in a downlink of the mobile communication system is configured to be set to the parameter; and
the parameter is configured to be included in a MIB (Master Information Block) forming the broadcast information.

3. The mobile communication system according to claim 1, wherein
a frequency bandwidth used in an uplink of the mobile communication system is configured to be set to the parameter; and
the parameter is configured to be included in a SIB (System Information Block) forming the broadcast information.

4. The mobile communication system according to claim 1, wherein
the predetermined value includes a first predetermined value and a second predetermined value;
the second mobile station is configured to determine, when the first predetermined value is set to the parameter included in the received broadcast information, that the second frequency bandwidth formed by an even number of resource blocks is the frequency bandwidth used in the mobile communication system; and
the second mobile station is configured to determine, when the second predetermined value is set to the parameter included in the received broadcast information, that the second frequency bandwidth formed by an odd number of resource blocks is the frequency bandwidth used in the mobile communication system.

* * * * *